United States Patent [19]

Lohoff

[11] 4,222,035

[45] Sep. 9, 1980

[54] MULTIPLEX SYSTEM HAVING DIGITAL CODED POWER LINE SIGNALS

[76] Inventor: Warren G. Lohoff, 6218 Cedar Springs, Dallas, Tex. 75235

[21] Appl. No.: 909,502

[22] Filed: May 25, 1978

[51] Int. Cl.² .......................... H04Q 1/40; H04B 3/00
[52] U.S. Cl. .......................... 340/167 R; 340/310 A; 340/203
[58] Field of Search .............. 340/310 R, 310 A, 176, 340/167 R, 203, 210

[56] References Cited

U.S. PATENT DOCUMENTS

| | | | |
|---|---|---|---|
| 4,007,458 | 2/1977 | Hollabaugh | 340/310 A |
| 4,097,692 | 6/1978 | Felix | 340/310 R |
| 4,106,007 | 8/1978 | Johnston et al. | 340/310 R |
| 4,131,882 | 12/1978 | Hollabaugh et al. | 340/310 A |

Primary Examiner—Donald J. Yusko

Attorney, Agent, or Firm—Roger A. Marrs

[57] ABSTRACT

An electronic control circuit is disclosed herein for transmitting a coded signal and operating power to a selected one of a plurality of receivers via a single pair of wires. The control circuit includes a transmitter coupled to a source of AC line voltage and having a coding network for coding signals consisting of missing cycles from the AC line voltage so that a resultant output signal constitutes both the coded signal to the receiver and the operating power for the same receiver. Timing networks are included in the transmitter control circuit for allowing the output signals to be transmitted to the selected receiver only within a brief time interval. Reset networks are interconnected within the transmitter control circuit and the timing networks for returning the transmitter control circuit back to a condition of awaiting asynchronous commands for forwarding to a selected receiver via the single pair of wires.

4 Claims, 4 Drawing Figures

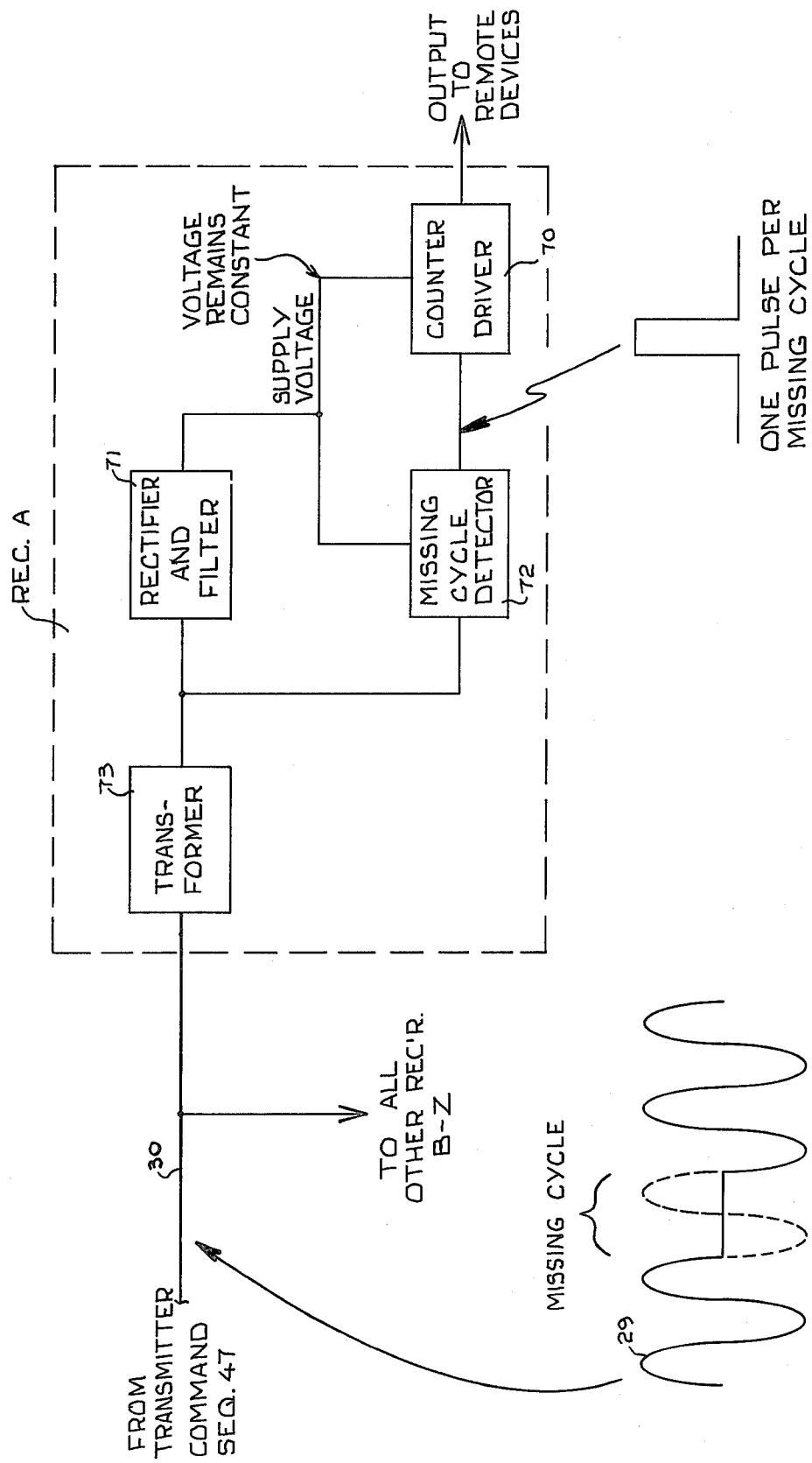

MULTIPLEX SYSTEM HAVING DIGITAL CODED POWER LINE SIGNALS

BACKGROUND OF THE INVENTION

1. Field of the Invention

This invention relates to electronic multiplexing circuits for conducting multiple signals from one equipment to another and more particularly to a novel multiplex system for controlling remote receivers by employing a single pair of wires carrying digital coded power line signal for a brief interval.

2. Background of the Prior Art

In the past, it has been common practice to place a plurality of signals on a single wire or a pair of wires, such as coaxial cable, for the purpose of transmitting the multiple messages to a remote location. By employing frequency division techniques, a great many messages may be placed on a single wire for transmission. Such a procedure is often used in a variety of telemetering networks.

However, difficulties and problems have been encountered with prior industrial multiplex and telemetering systems employing coded tones superimposed upon the power line which stem largely from the fact that it is difficult for the circuits to insure against false operation in the event of voltage spikes or other spurious or false signals. These undesired voltage spikes or transients are generally associated with heavy inductive loads, such as solenoids, multihorsepower motors, or the like coupled on the same circuit or particularly in the instance of the presence of lightening. The unwanted voltage spikes or transients have the undesired effect of operating the remote equipment when it is not desired to have such equipment in operation.

Therefore, a long standing need has existed to provide a properly designed multiplex system having transient signal immunity and which will conduct control signals for both information and power on the same wire or line.

SUMMARY OF THE INVENTION

Accordingly, the above problems and difficulties are obviated by the present invention which provides a novel two wire multiplex system having a transmitter for modifying AC power voltage into a coded power source for a selected one of a plurality of remotely located receivers. The transmitter includes circuitry which can accept up to a predetermined separate number of inputs and additional circuitry for coding of inputs which are then transmitted via a single pair of wires to a selected one of the receivers. The transmitter includes means for coding the output signal so that only the selected receiver is enabled while all the receivers employ the signals as their operating power. Additional circuits are provided for coding the power signal by deleting certain cycles of the normal 60 cycle AC power voltage and networks are provided for permitting the receivers to accept the coded power signal only during a brief interval within the transmission sequence.

Therefore, it is among the primary objects of the present invention to provide a novel multiplex system having electronic means for providing transient immunity so that spurious and undesired signals will not activate remotely located equipment.

Another object of the present invention is to provide a novel multiplex system whereby multiple signals can be carried on a single pair of wires and wherein the signal is a coded AC power voltage signal supplying not only coded information to remote equipment but supplying the power therefor.

A further object of the present invention is to provide a novel two wire multiplex system suppressing or rejecting transient signals on a single pair of wires conducting coded power signals to remote equipment.

Still a further object of the present invention is to provide a novel two wire multiplex system for transmitting a signal consisting of missing cycles from a 60 Hz power line wherein the signal also constitutes the power supply for a receiving unit.

One additional object, unlike the common superimposed tone technique of power line multiplexing, frequency bandwidth requirements of the novel system are no more than the normal 60 Hz power, allowing operation through transformers and normal power handling devices with no degredation to signals.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 4 is a block diagram of a typical receiver connected to output line 30 of the transmitter shown in FIG. 1.

DESCRIPTION OF THE PREFERRED EMBODIMENT

Figure 1:
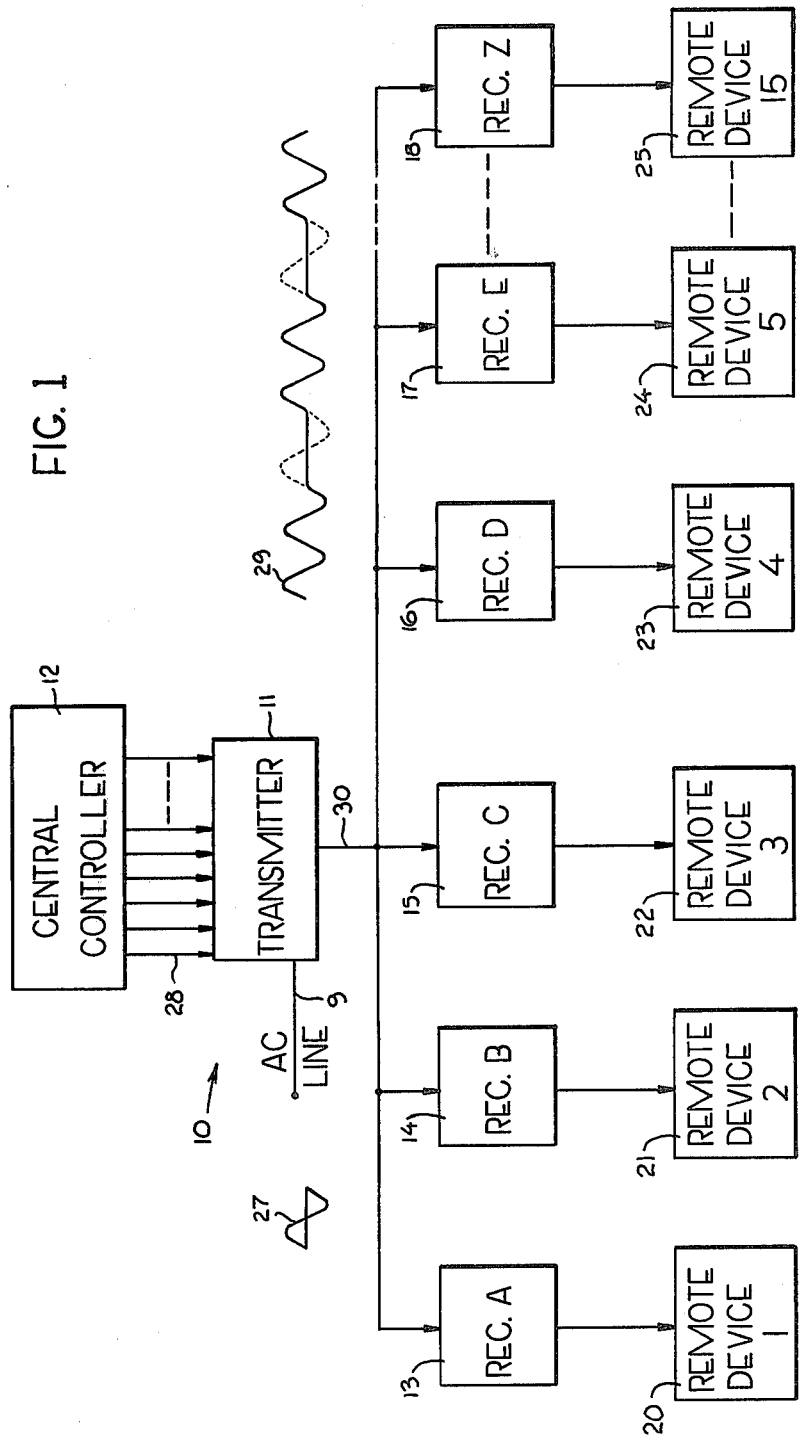
FIG. 1 is a block diagram showing a typical installation for the novel two wire multiplex system of the present invention.

Referring now to FIG. 1, the novel multiplex system and Ac line transmitter is illustrated in the general direction of arrow 10 and it comprises, in general, a transmitter 11 adapted to receive a plurality of signals from a central controller 12. The basic function of the multiplexer transmitter 11 is to control selected ones of remotely located receivers 13–18 inclusive. An AC power voltage signal 27 introduced on line 9 is interrupted by selected circuits within transmitter 11 so as to code a signal for operating a selected receiver of the plurality. Additional circuits within the transmitters are arranged so that the coded signal will be transmitted only during a brief interval or time period. The central controller 12 supplies commands to the transmitter via a plurality of command lines such as line 28. It is to be understood that although six command lines are shown extending from the central controller through the transmitter, additional command lines may be employed so that for example, fifteen commands can be handled by the inventive design. The interruptions on the Ac power line consituting the coded signal is indicated in general by the numeral 29 and it can be seen that the code is implemented on the power line signal by eliminating certain cycles in the frequency pattern. It is this coded relationship which not only energizes or provides power to a receivers 13–18 but selects one of the receivers from the plurality for the desired output signal. The coded signal 29 is introduced to the plurality of receivers via a single pair of wires indicated by numerals 20–25 inclusive whereby the original signal on line 28 is provided to the appropriate input.

Therefore, it can be seen that a unique feature of the present invention resides in the fact that the plurality of multiple receivers 13–18 obtain their operating power from the control pair of wires 30 and that the operating power from the control pair of wires 30 and that the operating power signal is coded by interrupting the chain of cycles so as to provide missing cycles from this power signal.

Figure 2:
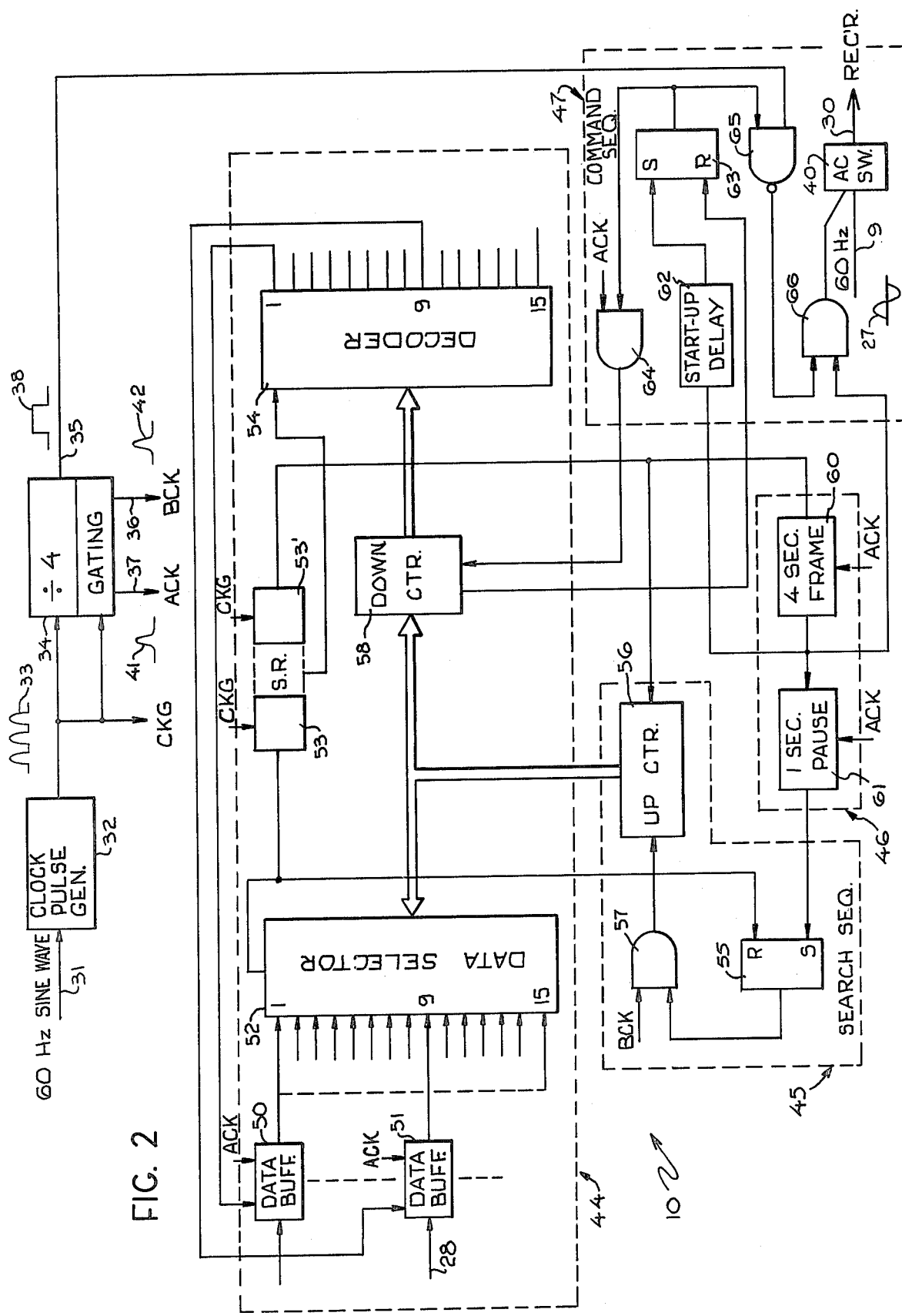
FIG. 2 is a schematic drawing showing the logic circuit for the transmitter employed in the novel multiplexer shown in FIG. 1.
Figure 3:
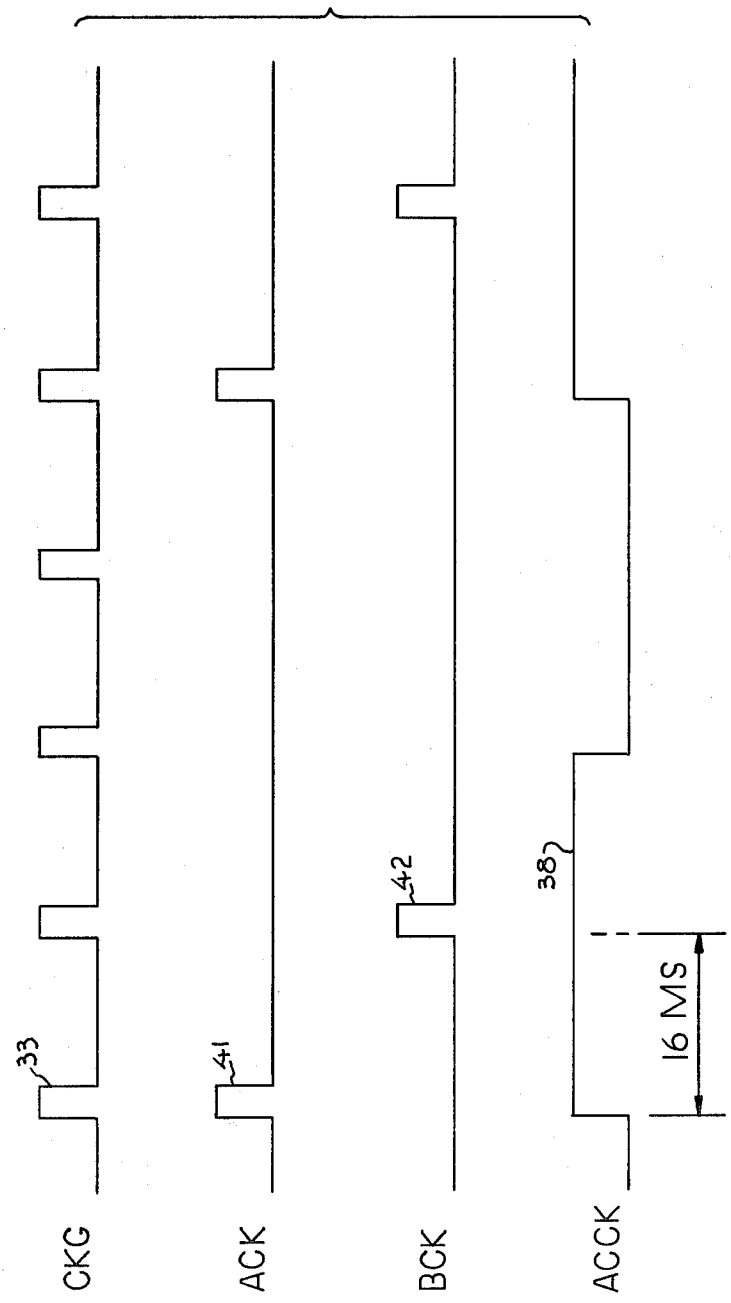
FIG. 3 is a timing diagram illustrating various wave shapes and their relationship with respect to each other between the search and command sequences.

Referring in detail to FIG. 2, the multiplexer and AC line transmitter 10 is shown in logic diagram form. Initially, a circuit timing will be described so that signal information and the control or flow thereof can be discussed with reference to additional circuitry. The transmitter 10 employs a 60 Hz line voltage having a conventional sinewave for the basic clock frequency. The line voltage is introduced to a clock pulse generator 32 via line 31. This generator initiates a series of clock pulses (CKG) at a rate equal to the line frequency and the wave form is identified by the numeral 33. The series of clock pulses 33 are introduced to a dividing network 34 which divides the series or pulse frequency by four and is provided with output along lines 35, 36 and 37. The output on line 35 is a square wave identified by numeral 38 (ACCK) which is used along with the additional signals to modulate an AC switch 40. The output on line 37 is a timing pulse (A CLOCK) (ACK) and this is one-fourth of the CKG frequency. The third output on line 36 is a timing pulse (B CLOCK) (BCK) that is also one-fourth of the CKG frequency but is delayed from the ACK pulse by one CKG pulse. This latter relationship is shown more clearly in the timing diagram of FIG. 3 which relates the various timing signals.

The ACK pulse is identified by numeral 41 while the delayed BCK pulse is identified by numeral 42.

Reference will now be made to a series of control loops included in the circuit of the transmitter. Basically, there are four control loops in the system and all the loops are indicated on the circuit of FIG. 2. The first control loop 44 may be referred to as the input data buffer loop and the second loop 45 may be referred to as the input command search sequence. The third control loop 46 is the basic operation control while the last or fourth control loop is the command transmission sequence identified in general by the numeral 47. The four control loops are interrelated in that some of the components or networks included in one control loop are used in other control loops. However, each of the control loops will be described separately for clarity.

The input data buffer comprising the first control loop 44 is composed of at least 15 data buffer circuits in the present instance of which a pair are represented by numerals 50 and 51, a data selector 52, a shift register 53 and a decoder 54. The function of this loop is to receive asynchronous commands from the central controller 12 for coded transmission to a selected receiver 13–18 inclusive. A signal is generated by the central controller 12 and this signal is directed along a selected line to its pre-assigned channel input at the multiplex transmitter. The command signal from the controller can be removed from the transmitter input before it is processed; but, if the command signal is still present after transmission, it will not be sent again. The input command signal can appear at a data buffer such as data buffer 50 at any time but will not appear at the data selector 52 until there is an ACK timing pulse 41. The operation of the data selector, as well as the remaining discussion of the operation of the input data buffer loop, is included with respect to discussion of the remaining loops.

The input command search sequence loop 45 is composed of a search sequence flip-flop 55, an up-counter network 56 and the previously mentioned data selector 52. The purpose of the command search sequence loop 45 is to scan the plurality of input lines from the controller 12 for the presence of command signals. If a command signal is present on one of the lines, such as line 28, the line is identified by a particular binary number assigned to it. The search sequence flip-flop 55 is "set" upon application of power to the system. This enables the BCK pulses 42 for application to the up-counter network 56 via a gate 57. This pre-sets to zero. When the up-counter network equals the number of the input command signal, the command appears at the output of the data selector and re-sets the search sequence flip-flop 55. Resetting the flip-flop stops the up-counter 56. The time difference between the ACK pulse and the BCK pulse prevents unstable operation of the first and second control loops. The data selector output identifies the command signal by loading the binary number into a down-counter 58 and serves to re-set the appropriate data buffer 50 and to remove the command signal from the data selector 52. The command signal will not re-appear at the data selector until the command signal has been removed from the input and subsequently reapplied.

A second control loop 45 is closed by application of the CKG pulse 33. The command signal is shifted through a second command register 53' which pre-sets the up-counter network 56 to zero and enables a four second frame circuit 60 which is part of the third control loop 46. By pre-setting the up-counter network 56 to zero, a hierarchy is established where the lowest command number will always be transmitted first in sequence.

The third control loop 46 is comprised of the four second frame timer 60, a one second pause timer 61 and the second control loop 45. The operation control loop 46 operates the AC line power signal to the receivers 13–18. When the four-second frame timer 60 is initiated, power is applied to all of the receivers for four seconds except for periods controlled by the fourth control loop 47. After the twelve seconds has elapsed, the one second pause timer 61 is started. This action allows all of the receivers to receive a power down and reset signal. Upon completion of the pause, the search sequence flip-flop 55 is set so as to enable the second and therefore, also, the first control loop 44 and 45 respectively.

The command transmission sequence loop is composed of a start-up delay circuit 62, a command sequence flip-flop 63, the down-counter 58 and a plurality of logic gates 64, 65 and 66. The transmission command is delayed from the initiation of the four second frame network 60 by the start-up delay circuit 62 so as to allow a regulated DC power supply to achieve operating level and to stabilize. The start-up delay output sets the command sequence flip-flop 63 which enables the ACK to the down-counter 58. The output from the command sequence flip-flop 63 also enables the square wave 38 output from the network 34 for operation of an AC switch control 40 via gate 65 and 66. For each count down, the AC line is disabled for two line voltage cycles constituting the coded signal and which the receiver counts up as one count. As the down counter clock line goes high, when the count is zero, the command sequence flip-flop 63 is reset. This enables the square waves 38 and the AC power voltage cycle is interrupted for the remainder of the four second frame. This completes the transmission of the input command to the transmitter.

In FIG. 4, a typical receiver is illustrated such as receiver A as shown in FIG. 1. Power for the receiver A is introduced via line 30 in the form of an AC voltage which is reduced to a lower voltage by a step-down transformer 73. The output from the transformer is introduced in parallel to a rectifier and filter 71 and to a missing cycle detector 72. The rectifier and filter 71 converts the reduced AC voltage to a DC voltage suitable for powering the detector 72 and a counter driver 70. The function of the filter 71 is such that it stores energy during the time a voltage is impressed across it and then releases this energy during the periods where no voltage is present. As long as the length of time during this "no voltage" period does not exceed the designed values for this filter, a constant supply voltage is provided to all power requiring components in this circuit.

It is apparant that by this technique, it is possible to interrupt the AC voltage by eliminating cycles at line 30 for a short length of time which can then be detected by the detector 72 without interrupting the supply voltage. In other words, the technique for decoding the "missing cycles" or "no voltage" at the receiver A is dependant upon the fact that the period of each missing cycle is considerably shorter than the time constant of the receiver power supply filter. That is, the filter capacitor stores sufficient amounts of energy to provide power during the brief "missing cycles" interruption.

In view of the foregoing, it can be seen that the novel multiplex system of the present invention is designed so that all the transmissions to as many as 100 receivers may be achieved over a two wire signal pair represented by numeral 30. When the transmitter is keyed to transmit by the central controller 12, a solid state switch 40 is closed transmitting AC power to each receiver. Initially, without the transmitter keyed, the two wire pair or cable is shorted or clamped to ground to prevent any possible input to a receiver from an outside high voltage source such as a lightening arc or the like. The Ac power signal from the transmitter not only energizes or powers the receiver but contains a code for enabling a particular receiver output of the plurality. By employing this novel approach, all the transient or spurious signals are prevented from reaching the receiver and secondly, the receivers are not capable of accepting any signals except for a brief time interval or period, approximately 5.5 seconds during the transmission sequence. It can be shown mathematically that the odds against false operation are almost 16,000 to one even if the multiplex reveiver has no other means of suppressing or rejecting transient signals.

With respect to a selected receiver operatio, the receiver as shown in FIG. 4, is designed to detect any missing AC cycles in the transmitted signal train on line 30. Each missing cycle produces pulses from the detector 72 which causes a counter 70 to count-up. Upon completion of the data transmission, the receiver fixes the count and codes a specified decoder/demultiplexer to a desired channel. The channel closes a reed replay which in turn provides line power to the appropriate external unit, such as one of the remote devices or units 20-25 inclusive.

For decoding purposes within the receiver, the receiver circuit includes a 10 mfd capacitor connected to ground so as to form a RC time constant. This time constant is the means which provides the missing AC "detection". The input to this circuit is the RC time constant of an AC filter network 71. A conventional one-shot multivibrator in the detector 72 is set to trigger at one volt for detecting the charging time of the RC circuit. As long as there is an AC constant cycle at the input to the receiver, the input through the one-shot multivibrator does not reach one volt. The moment there is a missing pulse at the input greater than 10 MS, the voltage at the input of the one-shot multivibrator reaches one volt, firing the circuit. Each output firing of the one-shot multivibrator is the means which clocks the upper-counter in the receiver. The counter is then fixed on a selected one of the output channels. This code closes the proper relay providing line power to the external unit.

Therefore, it can be seen that the multiplexer system of the present invention provides an economic and fail safe means for selectively energizing and powering the controlled unit. All transmission takes place between the transmitter and the receiver over a single pair of wires and the signal comprises a coded AC power signal which not only selects a particular receiver but energizes or powers the receiver into operation.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A multiplex system comprising:
   a transmitter;
   controller operably coupled to said transmitter for activating said transmitter;
   a plurality of receivers remotely located from said transmitter;
   a single pair of wires interconnecting said transmitter to said receivers for conducting a coded power signal from said transmitter by said controller;
   each of said receivers having a decoding means enabling said receiver to respond to said coded power signal;
   said coded power signal is an AC line voltage signal for energizing said power circuits of said receivers and said coded power signal further includes interrupted cycles of the AC voltage constituting a code for generating said output signal from said selected one of said receivers in said plurality of receivers;
   said transmitter includes a means for rendering selected ones of said receivers inoperable in accordance with said coded power signal; and
   means coupled to said last mentioned means for permitting transmission of said coded power signal for a brief interval.

2. The invention as defined in claim 1 including at least four control loops in said transmitter wherein each loop comprises:

a data buffer control loop coupled to said controller for accepting asynchronous commands for transmission to a selected one of said receivers;

a search control loop coupled to said data buffer control loop for scanning said commands;

an operational control loop coupled to data buffer and said search control loops for operating said AC power line to said receivers; and a command transmission sequence for placing the code in said AC power signal and inroducing said coded power signal to said receivers.

3. The invention as defined in claim 1 wherein:

each of said receivers includes a transformer having its input coupled to receive said coded power signal;

a rectifier and filter network and a missing cycle detector coupled to the output of said transformer;

a counter driver and said detector coupled to selectively receive operating power from said rectifier and filter network; and said counter being responsive to a pulse output from said detector to produce an output signal depending upon the number of pulses received from said detector.

4. The invention as defined in claim 3 wherein:

said rectifier and filter network includes a capacitor for storing energy during the time voltage is impressed across it and for releasing the energy during times when no voltage is present so as to constitute a constant supply voltage to said detector and said counter driver.

* * * * *